United States Patent [19]

Engel

[11] Patent Number: 4,549,715
[45] Date of Patent: Oct. 29, 1985

[54] APPARATUS FOR PROVIDING A GASEOUS PRESSURE PULSE

[75] Inventor: Mark R. Engel, Apple Valley, Minn.

[73] Assignee: Donaldson Company, Inc., Minneapolis, Minn.

[21] Appl. No.: 522,348

[22] Filed: Aug. 11, 1983

[51] Int. Cl.$^4$ .............................................. F16K 31/02
[52] U.S. Cl. .................................. 251/29; 251/30.03; 251/43; 251/144; 251/44; 137/590; 137/901
[58] Field of Search ...................... 251/29, 30, 144, 43, 251/44; 137/DIG. 2, 590, 583

[56] References Cited

U.S. PATENT DOCUMENTS

| | | | |
|---|---|---|---|
| 272,040 | 2/1883 | Graham | 137/DIG. 2 |
| 595,061 | 12/1897 | Gulland | 137/DIG. 2 |
| 641,009 | 1/1900 | Gulland | 251/44 X |
| 1,345,496 | 7/1920 | Keeler | 137/DIG. 2 |
| 2,028,177 | 1/1936 | Williams | 137/DIG. 2 |
| 2,666,451 | 1/1954 | Ray | 251/29 |
| 3,360,234 | 12/1967 | Thorburn | 251/44 X |
| 3,459,403 | 8/1969 | Royer | 137/533.21 |
| 3,525,358 | 8/1968 | Ludwig | 137/533.4 |
| 3,598,143 | 8/1971 | Mott | 137/583 X |
| 3,807,686 | 4/1974 | Furusawa | 251/43 |
| 3,905,393 | 9/1975 | Hartwig | 137/DIG. 2 X |
| 3,905,575 | 9/1975 | Zeuner et al. | 251/29 X |
| 4,033,732 | 7/1977 | Axelsson et al. | 137/590 X |
| 4,157,899 | 6/1979 | Wheaton | 55/273 |
| 4,201,362 | 5/1980 | Nishimi et al. | 251/29 |

FOREIGN PATENT DOCUMENTS

| 660219 | 3/1963 | Canada | 251/29 |
|---|---|---|---|
| 65399 | 7/1913 | Switzerland | 251/44 |

*Primary Examiner*—Samuel Scott
*Assistant Examiner*—Carl D. Price
*Attorney, Agent, or Firm*—Merchant, Gould, Smith, Edell, Welter & Schmidt

[57] ABSTRACT

The present invention is directed to an apparatus (10) for providing a gaseous pressure pulse. Apparatus (10) includes a container (12) having an exhaust path through ports (30) and (26) of a first valve (20) when a space (32) above a ball closure element (44) is relieved of overambient pressure through ports (82) and (46) of a second valve (22) when space (84) is relieved of overambient pressure by a solenoid valve (72). The first and second valves (20,22) are structured to relieve the overambient pressure on the unsealed sides of the closure elements (44,74) rapidly thereby rapidly opening the exhaust path to create a high volume, low pressure pulse.

2 Claims, 2 Drawing Figures

APPARATUS FOR PROVIDING A GASEOUS PRESSURE PULSE

FIELD OF THE INVENTION

The present invention is directed to an apparatus for providing a gaseous pressure pulse and, more particularly, to a valve mechanism for rapidly releasing a large volume of low pressure air from a pressure container to provide a low pressure pulse to an associated machine.

BACKGROUND OF THE INVENTION

Although there may be many applications for such low pressure pulsing apparatus, an identified application is a reverse pulse mechanism for an industrial filter device. Such filter devices commonly have a housing divided into inlet and clean air chambers. The housing is divided with a partition having a plurality of apertures. A sock or bag of suitable fabric, often on a wire frame, is ordinarily suspended from each aperture. A suitable pump or blower causes air flow through the bags so that undesired particulate matter is filtered from the air. The particulate matter collects on the outer surface of the bags. Cleaning of the bags is accomplished by directing brief jets of air into the bags to reverse the air flow through the bags thereby subjecting them to a minor physical shaking and causing collected particulate matter to break away. The particulate matter falls to the bottom of the inlet chamber for removal either intermittently or continuously through a rotary air lock or other device.

Present devices are unable to release a high volume of low pressure air rapidly and, therefore, utilize a single high pressure chamber to release bursts of high pressure air into selected bags or filters at periodic intervals. Present systems commonly require a large quantity of valves and considerable plumbing and actuating mechanisms for the various valves.

U.S. Pat. Nos. 3,417,776 and 3,525,358 show different apparatus wherein relief valves release the pressure created by an explosion to protect a vessel from exploding. Each valve is essentially a spherical ball retained in a housing. The ball is forced into a sealing location by a slight external overpressure. Ordinarily, a plurality of such valves are fastened to the vessel. On explosion, each ball is forced into the housing and away from the sealing location thereby opening the port to the container and exposing a relatively large opening. These explosive relief valves require an overpressure from outside the container to hold the ball in a sealing position. During the explosion, the valves operate to release pressure from the ordinarily sealed port.

Known art does not include a valve which can rapidly release a large volume of low pressure gas from a container into, for example, an industrial air filtration machine.

SUMMARY OF THE INVENTION

The present invention is directed to an apparatus for providing a gaseous pressure pulse. The apparatus includes a first container for holding a gaseous fluid which is in fluid communication with a pressurizing mechanism. The first container has an exit or first passage with a first cross sectional area through which the gaseous fluid passes as appropriate. The apparatus further includes a second container and a mechanism for bleeding gaseous fluid from the first container to the second container. The bleeding mechanism has a second passage with a second cross sectional area. The apparatus includes a mechanism for sealing the exit passage. The apparatus also includes a mechanism for relieving overambient pressure in the second container through a third passage having a third cross sectional area, the first and third cross sectional areas being greater than the second cross sectional area of the various passages. The relieving mechanism includes a mechanism for unsealing the sealing mechanism and opening the exit passage as the overambient pressure in the second container is relieved through the third passage to ambient.

More particularly, a preferred embodiment has first and second valves for controlling flow of the gaseous fluid from the first container. Each valve includes a walled enclosure with at least three ports for fluid passage therethrough. A closure element is located within the enclosure and is biased ordinarily by a coil spring to close a first of the three ports. The first valve is preferably located inside the first container while the second valve is preferably located outside the first container. The closure element for the first valve is preferably a spherical ball while the closure element for the second valve is preferably a flexible diaphragm. Each valve includes a mechanism for bleeding fluid from one side of the closure element to the other. With respect to the first valve, fluid may bleed between the spherical ball and the wall of the enclosure. With respect to the second valve, a small opening in the diaphragm allows fluid to bleed therethrough. A mechanism for relieving overambient pressure from one side of the diaphragm of the second valve allows the diaphragm to operate and overambient pressure to be relieved from one side of the ball which thereby causes the ball to be forced away from its ordinarily closed position in the exit passage of the first container. That is, the first port of the first valve is connected to the exit passage of the first container. The first port of the second valve is connected to the second port of the first valve. The second port of the second valve is connected to the relieving mechanism, usually a solenoid valve. The third port of the first valve is open to the inside of the first container, while the third port of the second valve is open to ambient pressure outside the first container. Thus, when the relieving mechanism functions to relieve the overambient pressure on the outermost side of the diaphragm, the diaphragm is forced away from the first port thereby relieving the overambient pressure on one side of the spherical ball through the third port of the second valve. The spherical ball is then forced away from the first port by pressurized fluid in the first container. Since the various pressurized fluids on the unsealed sides of the closure elements are evacuated from small spaces very rapidly, the closure elements move rapidly thereby opening fluid communication between the exit passage and the first and third ports of the first valve very rapidly. Since the ports in the first valve are relatively large, and since the closure element is rapidly moved, pressurized fluid in the first container is rapidly evacuated to provide a desired low pressure, high volume pulse.

The present invention achieves its particularly advantageous result by utilizing tandem valves wherein the first valve is inside the pressurized container while the second valve is outside. The enclosures on the unsealed sides of the closure elements are increasingly smaller in going from the first to the second valves. Thus, the solenoid valve rapidly releases pressure on the unsealed side of the diaphragm allowing the diaphragm to unseal so that the second valve may open and release pressurized fluid rapidly on the unsealed side of the first valve. Since the first valve is inside the pressurized container, the pressurized fluid in that container is able to rapidly accelerate the spherical ball thereby opening the first valve and the exit passage of the first container. The advantageous result of the present invention allows it to be used in various applications including that of providing a reverse pressure pulse in industrial air cleaners in order to remove accumulated particulate matter as described hereinbefore.

These advantages and other objects obtained by this invention are further explained and may be better understood by reference to the drawings and to the descriptive matter hereinafter wherein a preferred embodiment of the invention is illustrated, and the invention is described in more detail.

DETAILED DESCRIPTION OF THE PREFERRED EMBODIMENT

Figure 1:
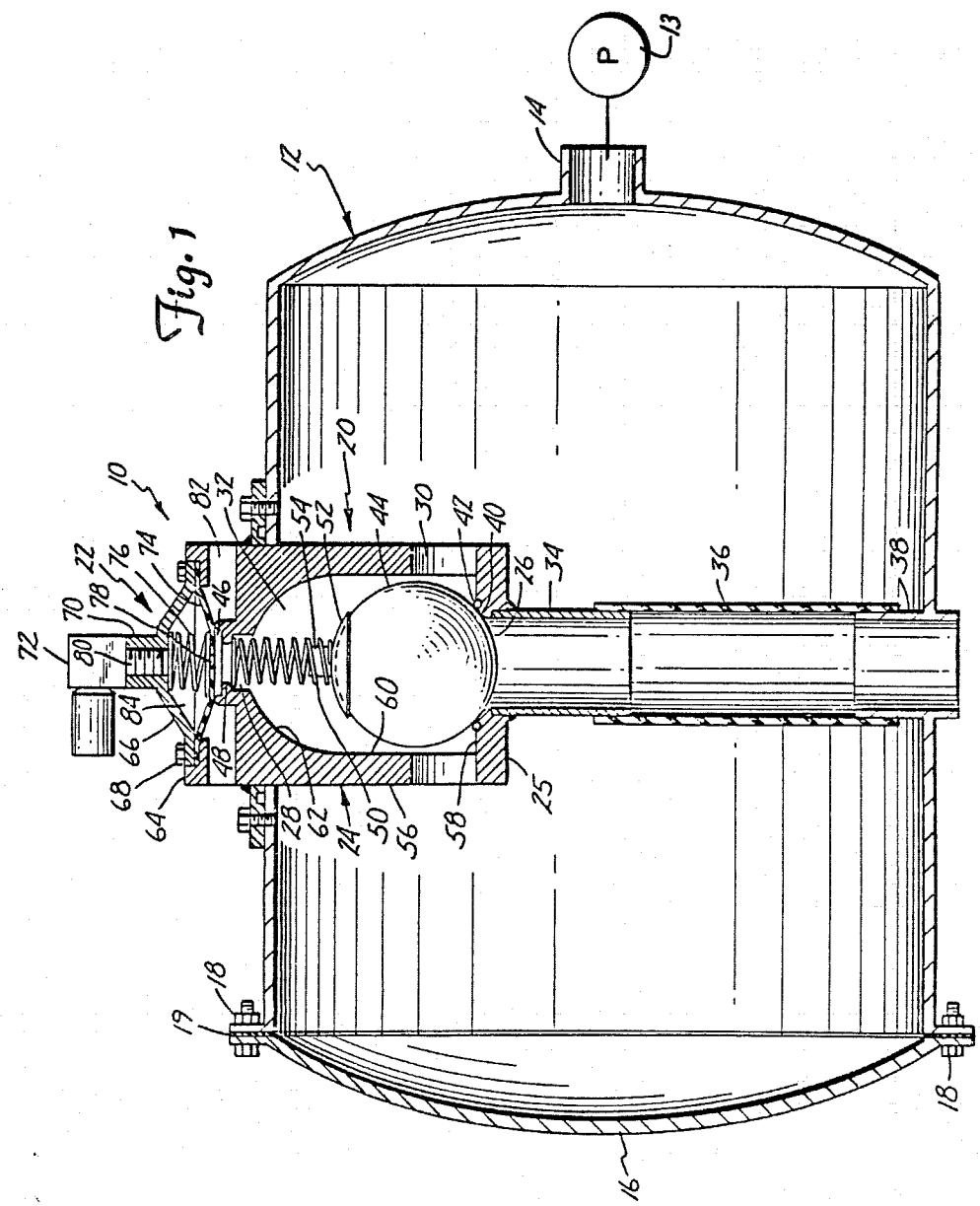
FIG. 1 is a cross-sectional, side view of an apparatus in accordance with the present invention, showing the first and second valves in closed configurations.

Referring now to the drawings wherein like reference numerals designate identical or corresponding parts throughout the several views, and more particularly to FIG. 1, an apparatus for providing a gaseous pressure pulse is designated generally by the numeral 10. Apparatus 10 includes a container 12 which may be pressurized with a pump 13, for example, at inlet passage 14. Container 12 preferably includes a head 16 or other mechanism for easy entry to the interior of container 12. Both container 12 and head 16 are flanged so they may be fastened together with nut and bolt combinations 18 and a gasket 19 or other sealing device.

Apparatus 10 further includes first and second valves 20 and 22. First valve 20 must have its third ports 30 in fluid communication with the interior of container 12 while second valve 22 must have its third ports 82 in fluid communication with the exterior of container 12. Therefore, it is preferable if first valve 20 is essentially located within the interior of container 12, while second valve 22 is located generally exterior to container 12. Although it is not necessary, as shown in the figures, valves 20 and 22 have a common housing 24. With respect to first valve 20, housing 24 includes first, second and third ports 26, 28 and 30, respectively, and an enclosure 32. First port 26 is a circular opening in the bottom 25 of housing 24. A tube 34 is welded or otherwise attached to housing 24 at port 26. Tube 34 is connected via a flexible tube 36 to an exhaust passage 38 formed or otherwise made in the wall of container 12. Port 26 has a bevel 40 bordered by a gasket 42 at its inner lip. Both bevel 40 and gasket 42 cooperate to form a seat for closure element 44. Closure element 44 is preferably a spherical ball. Second port 28 is located at the end of enclosure 32 opposite first port 26. Second port 28 is separated from, but in fluid communication with, first port 46 of second valve 22. The two ports 28 and 46 are separated by an annular protrusion 48 which functions as a stop or seat for coil spring 50. Spring 50 biases ball 44 against first port 26 so that first valve 20 is normally closed at first port 26. Cap 52 is contoured to mate with ball 44, and has a stub 54 attached integrally or otherwise to it for fitting within the spiral of spring 50. Cap 52 allows ball 44 to turn arbitrarily each time it oscillates within enclosure 32 without being scratched by spring 50. Ball 44, therefore, does not wear excessively in any one location.

Third port 30 is a plurality of openings about the wall of housing 24 at a location between the end 25 of housing 24 and the point along wall 56 where ball 44 is nearest wall 56 when ball 44 is seated to seal port 26. The combined cross sectional area of the third ports 30 is greater than the cross sectional area of the first port 26 of first valve 20.

Enclosure 32 has a flat surface 58 at end 25 of housing 24, and a cylindrical side 60 adjacent to surface 58. Side 60 matches hemispherical end 62 opposite surface 58. Enclosure 32 has length such that the distance between the lowermost point of ball 44 when ball 44 is forced as far as it can go into hemispherical end 62 and the plane defined by the upper end of first port 26 at enclosure 32 is at least 75% of the inside diameter of first port 26. Preferably, the indicated lift distance of ball 44 is 75% to 100% of the inside diameter of first port 26.

Spherical ball 44 has a diameter relative to the diameter of cylindrical wall 60 such that the total clearance area between the closest circumference of ball 44 to wall 60 and wall 60 is at least three times less than the smallest cross sectional area of the passage between first and second valves 20 and 22.

Second valve 22 is formed in the end of housing 24 which protrudes externally from container 12. The end 64 opposite end 25 has a circular opening with a machined groove into which fits a cover 66 fastened in place with bolts 68 which are threaded into housing 24. Cover 66 is frusto-conically shaped with the greater diameter mating with the flange attachment to end 64 of housing 24. The smaller diameter mates with a cylindrical plug 70 into which solenoid valve 72 threads. Bolts 68 hold diaphragm 74 between the flange of cover 66 and end 64 of housing 24. The centermost portion of diaphragm 74 is biased against first port 46 of second valve 22 by coil spring 76. In this fashion, second valve 22 is normally closed at first port 46. Diaphragm 74 includes a bleed opening 78 which allows pressurized fluid from enclosure 32 above ball 44 to leak through diaphragm 74 to equalize the pressure on both sides of diaphragm 74.

As with first valve 20, second valve 22 also has first, second and third ports 46, 80 and 82, respectively. First port 46 mates with second port 28 of first valve 20. First port 46 may be the same diameter as the annular protruberance 48 or, as shown in FIG. 1, may be slightly larger such that spring 76 can fit therein and force diaphragm 74 slightly downwardly therein to provide an effective seal at the edges of first port 46. Second port 80 is an opening in cylindrical plug 70 which communicates with solenoid valve 72. Third port 82 is one or more openings in the sidewall of housing 24 in the portion exteriorly of container 12. When diaphragm 74 is closed against first port 46, third port 82 is blocked by diaphragm 74 from communication with the other ports.

In use, solenoid valve 72 is normally closed. Springs 76 and 50 force closure elements 74 and 44 into sealing configurations with first ports 46 and 26 of second and first valves 22 and 20, respectively. In this configuration, exhaust passage 38 is closed and container 12 may be pressurized through inlet port 14. As container 12 pressurizes, gaseous fluid bleeds around ball 22 to pressurize enclosure 32 on the unsealed side of ball 44. At the same time, gaseous fluid bleeds through opening 78 to pressurize space 84 on the side of diaphragm 74 opposite first port 46.

Figure 2:
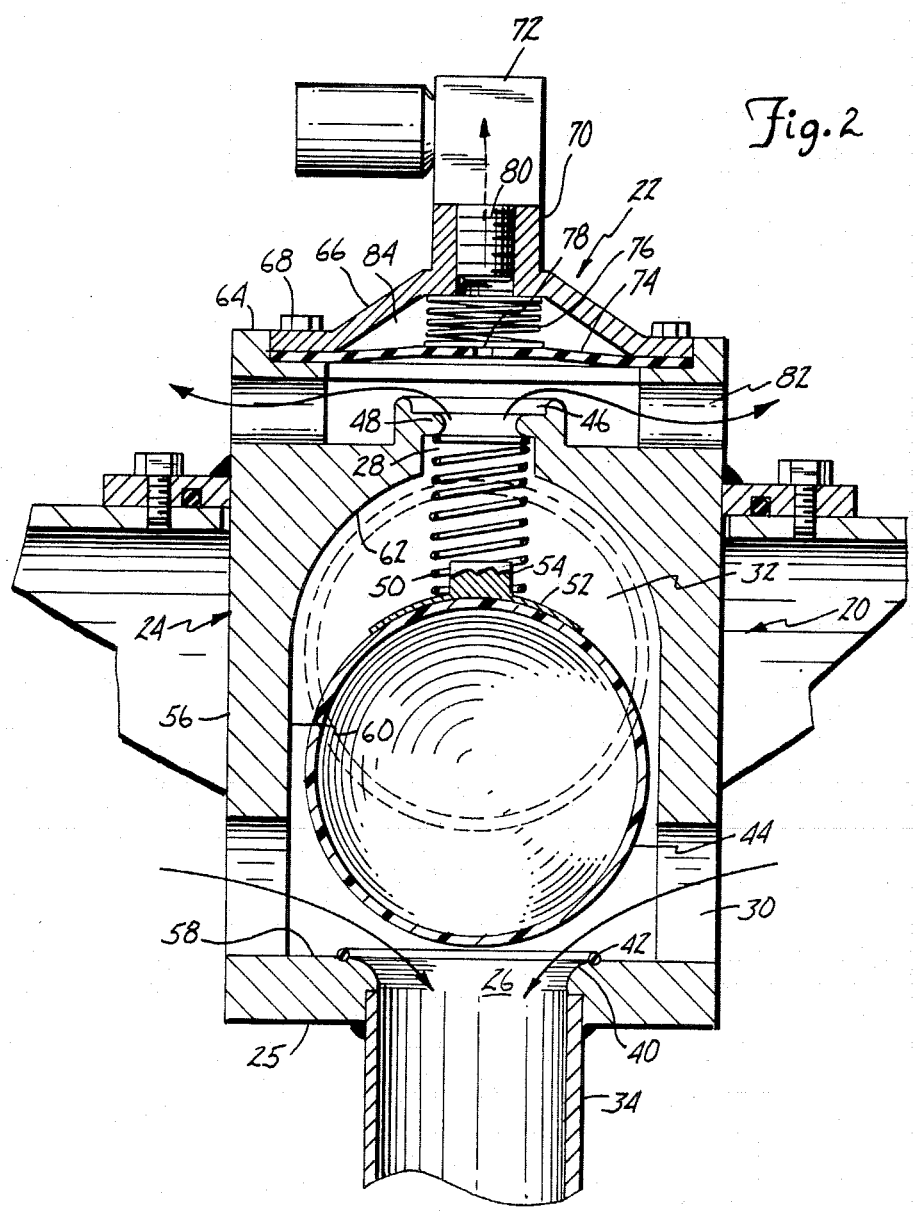
FIG. 2 is a cross-sectional, detail view of the valves in an open configuration.

With container 12 pressurized, solenoid valve 72 may be operated which in turn causes a change in configuration of second and first valves 22 and 20 thereby allowing the pressurized fluid in container 12 to rapidly dump through tubes 34 and 36 and exhaust passage 38 to create a pressure pulse. More particularly, as shown in FIG. 2, solenoid valve 72 is opened to relieve overambient pressure in space 84. Since the bleed opening 78 in diaphragm 74 is relatively small, overambient pressure in enclosure 32 cannot bleed rapidly enough through opening 78 to prevent the pressure beneath diaphragm 74 from forcing diaphragm 74 to compress spring 76. When diaphragm 74 is thus forced away from first port 46, the overambient pressurized fluid in enclosure 32 flows from second port 28 of first valve 20 through first port 46 and third port 82 to exhaust to ambient external of container 12. With the pressure on one side of ball relieved, pressurized fluid from container 12 flows through third ports 30 to contact a ringular portion of the side of ball 44 opposite spring 50 thereby forcing ball 44 to compress spring 50 against protuberance 48. Furthermore, since pressure is rapidly relieved from space 84 and since the passage between second and first valves 22 and 20 and the fluid path therefrom to port 82 is relatively large in cross section with respect to the volume of enclosure 32 above ball 44, the overambient pressurized fluid in enclosure 32 is rapidly released and ball 44 is impulsively moved from its sealed configuration to an unsealed configuration in contact with the hemispherical end 62 of enclosure 32. Note that FIG. 2 shows ball 44 just beginning to move from its sealed to its unsealed configuration. The phantom lines of FIG. 2 show the ball in its unsealed configuration. With ball 44 away from port 26, pressurized fluid in container 12 flows through ports 30 and beneath ball 44 to port 26 and therefrom through the various tubes to exit passage 38.

When the pressure in container 12 is sufficiently reduced, springs 76 and 50 extend and once again force the closure elements 44 and 74 against first ports 26 and 46.

It is important that ball 44 move upwardly far enough as indicated hereinbefore so that there is sufficient cross section to allow the pressurized fluid in container 12 to move rapidly to the exit path. Note the advantage of using a spherical ball with a mating cap 52 wherein the ball may arbitrarily rotate and, therefore, not wear at the contact locations with port 26 or the bias mechanism.

Note, also, that although it is necessary to have a closure element with slanted sides on which pressurized fluid in container 12 may act to force the element away from sealing first port 26, it is not necessary that the element be a spherical ball as indicated in the preferred embodiment. It is recognized, too, that the closure element of the second element need not be a diaphragm.

It is further noted that first and second valves 20 and 22 are formed in the same housing 24 in the preferred embodiment of FIGS. 1 and 2. Such valves may, however, be separately formed so that first valve 20 is interior to container 12 while second valve 22 is exterior with only a passage between the second port of first valve 20 and the first port of second valve 22. It would also be possible to locate the valves exteriorly of container 12 as long as ports 30 and 26 were appropriately connected with the interior of container 12.

Thus, although advantages of the invention, as well as details and alternatives of structure and function are set forth, changes made, especially in matters of shape, size and arrangement to the full extent extended by the general meaning of the terms in which the appended claims are expressed are understood to be within the principle of the present invention.

What is claimed is:

1. Apparatus for providing a gaseous pressure pulse, comprising:
   a first container for holding a gaseous fluid, said first container being in fluid communication with pressurizing means, said first container having an exit passage for said gaseous fluid;
   first and second valve means for controlling flow of said gaseous fluid;
   said first valve means including:
      a second container surrounded by said first container, said second container including a cylindrical wall with an hemispherical end and an end opposite said hemispherical end, said opposite end having a first exit port connected to said exit passage, said first exit port having a first inside diameter, said cylindrical wall having a second inside diameter larger than the first inside diameter, said first exit port defining a plane, said second container further including a second exit port located in the hemispheral end of said second container, said first and second exit ports being centered on the axis of the cylindrical wall, said second container enclosing a first portion adjacent to the end opposite said hemispherical end and a second portion adjacent to said hemispherical end, said cylindrical wall having a region adjacent to the end opposite said hemispherical end, said region having an opening therein;
      a spherical ball within said second container, said ball having a third diameter, said third diameter being smaller than said second diameter, said ball having a point nearest the plane defined by said first exit port, said point being separated from the plane defined by said first exit port by a distance of at least seventy five percent of the first inside diameter of said first exit port when said ball is positioned against said hemispherical end, the opening in said region arranged to be in constant fluid communication with said second exit port;
      means for biasing said ball against said first exit port; and
   said second valve means including:
      a walled enclosure with third, fourth and fifth ports for fluid passage therethrough;
      a closure element for controllably separating said third and fourth ports;
      means for biasing said element to close said third port and separate said third port from said fifth port, said third port being in fluid communication with the second exit port of said first valve means, said fourth port being open to ambient pressure external of said first container;
      means for bleeding said fluid from a first space bordered partially by a first side of said element adjacent the third port to a second space bordered partially by a second side of said element and said walled enclosure to equalize fluid pressure on both sides of said element;

means for relieving over-ambient fluid pressure in the second space of said second valve means, said fifth port being in fluid communication with said relieving means;

whereby when said relieving means relieves the over-ambient fluid pressure in the second space of said second valve means, said closure element moves to place said third and fourth ports in fluid communication and the over-ambient pressurized fluid in the second portion of said second container between said ball and said hemispherical end is relieved therethrough to ambient, the pressurized fluid entering the opening in said region of said cylindrical wall then forcing said ball into the second portion of said second container against said hemispheric end and thereby opening the interior of said first container to fluid communication with said exit passage through the opening in said second container.

2. Apparatus for providing a gaseous pressure pulse, comprising:

a first container for holding a gaseous fluid, said first container being in fluid communication with pressurizing means, said first container having an exit passage for said gaseous fluid;

first and second valve means for controlling flow of said gaseous fluid;

said first valve means including:

a second container located within said first container, said second container including a cylindrical wall with an hemispherical end and an end opposite said hemispherical end, said opposite end having a first exit port connected to said exit passage, said first exit port having a first inside diameter, said cylindrical wall having a second inside diameter larger than said first inside diameter, said second container further including a second exit port, said second exit port being located in the hemispherical end of said second container, said first and second exit ports being centered on the axis of the cylindrical wall, said cylindrical wall having a first portion adjacent the end of said second container opposite said hemispherical end, said first portion having an opening therein, said cylindrical wall having a second portion adjacent said hemispherical end;

a spherical ball within said second container, said ball having a third diameter, said third diameter being smaller than said second diameter said second container having a first space defined partially by said second portion and said spherical ball;

means for biasing said ball against said first exit port, said biasing means including a coil spring;

portion of the cylindrical wall arranged to be in constant fluid communication with said second exit port;

a cup attached to one end of said spring, said cup having a similar contour as said ball so as to mate with the ball thereby preventing said spring from scratching said ball; and said second valve means including:

a walled enclosure with third, fourth and fifth ports for fluid passage therethrough;

a closure element for controllably separating said third and fourth ports;

means for biasing said element to close said third port and separate said third port from said fifth port, said third port being in fluid communication with the second exit port of said first valve means, said fourth port being open to ambient pressure external of said first container;

means for bleeding said gaseous fluid from said first space bordered partially by a first side of said element adjacent the third port to a second space bordered partially by a second side of said element and said walled end closure to equalize fluid pressure on both sides of said element;

means for relieving over-ambient fluid pressure in the second space of said second valve means, said fifth port being in fluid communication with said relieving means;

whereby when said relieving means relieves the over-ambient fluid pressure in the second space of said second valve means, said closure element moves to place said third and fourth ports in fluid communication and the over-ambient pressurized fluid in the first space of said second container between said ball and said hemispherical end is relieved therethrough to ambient, the pressurized fluid entering the opening in the first portion of said cylindrical wall then forcing said ball into the second portion of said second container against said hemispheric end and thereby opening the interior of said first container to fluid communication with said exit passage through the opening in said second container.

* * * * *

UNITED STATES PATENT AND TRADEMARK OFFICE
CERTIFICATE OF CORRECTION

PATENT NO. : 4,549,715
DATED : October 29, 1985
INVENTOR(S) : Mark R. Engel

It is certified that error appears in the above-identified patent and that said Letters Patent is hereby corrected as shown below:

Column 8, claim 2, line 7, before "portion" insert therefor
--the opening in the first--.

Signed and Sealed this

Eighteenth Day of February 1986

[SEAL]

Attest:

DONALD J. QUIGG

Attesting Officer

Commissioner of Patents and Trademarks